United States Patent [19]
Siekmann

[11] Patent Number: 5,951,050
[45] Date of Patent: Sep. 14, 1999

[54] INTEGRAL RESERVOIR FOR TANK

[76] Inventor: Jim Siekmann, 598 Amherst St., Manchester, N.H. 03104

[21] Appl. No.: 08/932,661

[22] Filed: Sep. 18, 1997

[51] Int. Cl.$^6$ ....................................................... F15B 1/26
[52] U.S. Cl. .......................... 280/830; 137/264; 137/256
[58] Field of Search .................... 137/264, 256; 280/830; 123/446, 514

[56] References Cited

U.S. PATENT DOCUMENTS

| | | | |
|---|---|---|---|
| 4,188,969 | 2/1980 | Lotton et al. | 137/264 |
| 4,305,416 | 12/1981 | Henning et al. | 137/38 |
| 4,500,270 | 2/1985 | Tuckey . | |
| 4,540,354 | 9/1985 | Tuckey . | |
| 4,596,519 | 6/1986 | Tuckey . | |
| 4,813,445 | 3/1989 | Lu | 137/38 |
| 4,989,572 | 2/1991 | Giacomazzi et al. | 123/514 |
| 5,303,685 | 4/1994 | Forgacs | 123/510 |
| 5,398,655 | 3/1995 | Tuckey | 123/456 |
| 5,778,926 | 7/1998 | Tanaka et al. | 137/508 |

*Primary Examiner*—Lanna Mai
*Assistant Examiner*—Michael Cuff
*Attorney, Agent, or Firm*—Davis and Bujold

[57] ABSTRACT

The present invention is a system for storing and supplying a maximum amount of fuel from a fuel tank while maintaining a simple structure which is easy to gain access to and repair. The fuel tank structure includes a main fuel tank with an integral internal reservoir tank, a fuel pump, and primary and secondary fuel filters. The reservoir is permanently secured within the fuel tank and provides access, through a removable cover, to the fuel pump allowing efficient and cost effective maintenance to be performed whenever necessary. The system can be manufactured from a wide range of materials and is in compliance with the standards of the industry.

18 Claims, 4 Drawing Sheets

INTEGRAL RESERVOIR FOR TANK

FIELD OF THE INVENTION

The present invention relates to the field of fuel tanks and more specifically, to the field of gasoline tanks for automobiles.

BACKGROUND OF THE INVENTION

In the mid-1880s both Daimler and Benz began to build the first automobiles for mass production. Shortly thereafter Henry Ford began producing the Model T in the United States. Since that time, the automobile and its various components have been constantly re-engineered and improved upon, the goal being to balance factors such as cost, quality, comfort, performance and efficiency.

One essential component to the automobile is the container, i.e. the fuel tank, which holds the source of power, i.e. fuel. Although it may seem like the job of the fuel tank is a simple one, to hold the fuel, the demands of other external factors have influenced various transformations and versions of fuel tanks as the automobile has developed over the last century.

Engineers, when designing fuel tanks, attempt to maximize capacity and efficiency in retrieving the fuel from the tank while minimizing the complexity and associated manufacturing and repair costs. This factors must be balanced while still maintaining a standard of quality and reliability.

A major hurdle to overcome is often a lack of space in the automobile for a large, rectangular shaped fuel tank. As a result, fuel tanks have ended up being odd shaped containers, reaching into various apertures and gaps to take full advantage of all available space to store a maximum amount of fuel. This is typically done because the larger the fuel tank, the greater the range of the vehicle, and the fewer times the owner has to stop to refuel.

If space was not an issue, then the fuel tank would be designed to have a funnel-shaped base with a fuel pump inlet or pickup being located at the base of the funnel, such that all of the fuel in the fuel tank would be readily retrieved. However, because of the lack of space, fuel tanks often have a flat, or a substantially flat base. This creates a fundamental problem in retrieving the fuel, especially the last few gallons. When there is a small amount of fuel left in the fuel tank, various effects resulting from common driving procedures, like stopping, starting, turning, etc., cause the fuel to be forced away from the fuel pump inlet or pickup and collect along a side(s) and/or in a corner(s) of the fuel tank. When this occurs, the flow of fuel to the engine is interrupted, a drawback that engineers try to avoid.

If the design of the fuel tank does not take into consideration these aforementioned effects, the fuel system is not able to retrieve and pump the entire contents of the fuel tank and a portion of the fuel carried in the fuel tank becomes essentially useless, e.g. an 11 gallon fuel tank may only have 9.5 gallons of usable fuel. Engineers have studied this problem and proposed various methods to retrieve substantially all of the fuel from the fuel tank.

Some previous designs have included the concept of a fuel delivery module or reservoir within the fuel tank. This basic design involves a support extending from the top of the tank towards a bottom. A pump/reservoir component is slidably connected to the support such that the pump/reservoir component may move vertically. The pump/reservoir component rests on a bottom inside surface of the gasoline tank, and is typically supported by a hanger or a suspension system from above, which allows it to descend into the tank, along the support structure, as the fuel is consumed. The pump (typically within the reservoir) supplies fuel from the main fuel tank and delivers it directly to the engine as well as continuously supplying a small reservoir tank. The excess fuel from the reservoir tank overflows a top of the reservoir into the main tank.

At such time when the pump cannot supply any fuel from the main tank, because the main tank is empty, or the remaining fuel in the main tank is being forced away from the pump due to operation of the vehicle, the pump will draw fuel from the reservoir tank. The reservoir is designed to ensure that there is always fuel located adjacent the fuel pump inlet for all driving conditions (starts, stops, turns, etc.).

The systems that have been developed thus far to carry out these functions are complex and expensive. As stated previously, they have components such as support structures, hangers, and pumps that are enclosed in the tank. They are generally complex and expensive to manufacture, install and/or repair. If the system malfunctions, or a pump fails, it is a complicated process to repair the system; and if the pump needs to be replaced, other expensive components must also be replaced because they are interconnected with the pump. In the competitive world of automobile manufacturing, companies constantly strive to make vehicles that are of high quality, but cost the least amount of money to assemble, and the least amount of money to maintain. Until now, typical fuel tank pump repairs have included a lot of extra as well as superfluous costs.

OBJECTS OF THE INVENTION

Wherefore, it is an object of the present invention to overcome the aforementioned problems and drawbacks associated with the prior art designs.

An object of the present invention is to provide a fuel tank with a relatively simple structure which includes an internal reservoir tank formed integrally with the main tank.

A further object of the present invention is to provide a fuel tank system that has both low manufacturing costs as well as low repair costs.

Yet another object of the present invention is design a fuel tank that can be fabricated from a wide range of possible materials, such as various metals, plastics and composites.

Still another object of the present invention is to provide a fuel tank system that has fewer parts, relative to the prior art, and is easier to assemble.

A still further object of the present invention is to provide a fuel tank system that offers easy access to the fuel system components, for repair purposes, and allows a single malfunctioning component to be readily accessed and replaced while facilitating reuse of the other components.

It is still another object of the present invention to offer a high quality, stable, and reliable fuel tank and fuel tank system.

SUMMARY OF THE INVENTION

The present invention relates to an improved fuel storage system comprising: a fuel tank having an exterior wall defining an interior cavity, said interior cavity being suitable for holding a desired quantity of fuel, and said fuel tank having a fuel supply outlet for supplying fuel to an engine; and a reservoir being disposed within the fuel tank; wherein said reservoir is integral with said fuel tank and separates said fuel supply outlet from a remainder of said interior cavity of said fuel tank, said reservoir has an aperture in a base portion for providing communication between said reservoir and said remainder of said interior cavity of said fuel tank.

BRIEF DESCRIPTION OF THE DRAWINGS

The aforementioned objects and advantages of the present invention will be appreciated from the following description and accompanying drawings in which.

DETAILED DESCRIPTION OF THE INVENTION

Figure 1B:
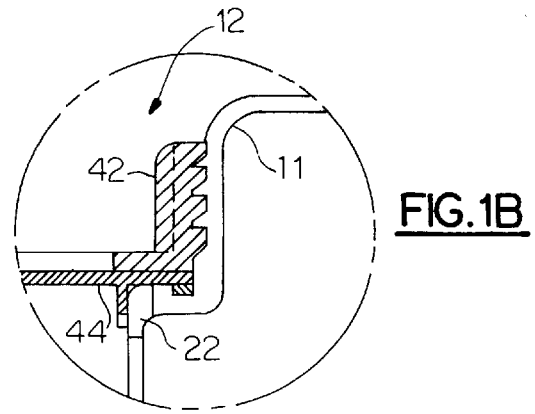
FIG. 1B is an exploded diagrammatic drawing of an alternate embodiment of a threaded mechanism for securing the fuel supply module to the tank, according to the present invention.
Figure 1A:
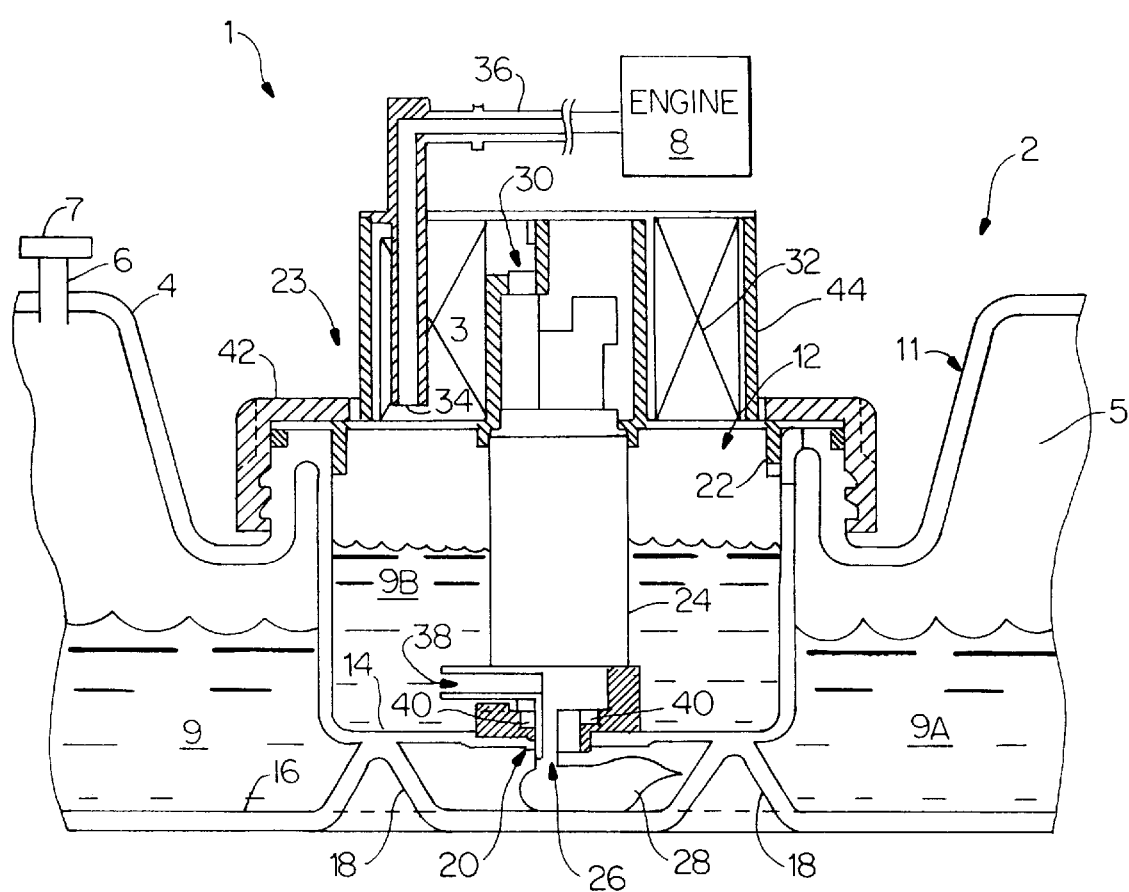
FIG. 1A is a partial diagrammatic drawing of the fuel tank, according to the present invention, with an integral reservoir tank in combination with a fuel pump.

Turning first to FIG. 1A, a detailed description of a first embodiment of the present invention will now be provided. As can be seen in this Figure, the fuel system 1 comprises a fuel tank 2 having an exterior wall 4 defining an interior cavity 5 which holds a desired quantity of fuel 9A, e.g. in the case of an automobile typically between 10 and 20 gallons of fuel. A fuel filling conduit 6, for refueling the fuel tank 2, is normally closed by a fuel cap 7 releasably engaging the open end of the filling conduit 6. As the present invention does not relate to any novel features concerning refueling of the fuel tank 2, a further detailed discussion concerning those conventional components is not provided.

The fuel system 1 of the present invention supplies fuel 9A to an engine 8 for driving the vehicle. The fuel tank 2 comprises a main tank 11 housing an integral reservoir 10 therein. The reservoir 10 holds a desired quantity of reserve fuel, typically between 0.4 to 1 or more liters of reserve fuel 9B, and separates a fuel supply outlet (tank opening) 12 of the tank 2 from a remainder of the main tank 11. A reservoir bottom wall 14 is spaced from, but secured to, a bottom wall 16 of the main tank 11, via a pair of spaced apart elongate support members 18. The support members 18 permanently secure the reservoir 10 to the main tank 11 to maintain the reservoir bottom wall 14 at a predetermined distance from the main tank bottom wall 16, e.g. an inch or so, to facilitate pumping fuel 9A from the fuel tank 2 as will be explained below in further detail.

An aperture 20 is provided in the central portion of the reservoir bottom wall 14 and establishes communication between the reservoir 10 and the main tank 11. The reservoir 10 is also provided with an overflow outlet 22, typically located adjacent the fuel supply outlet, which allows excess fuel 9B, supplied to the reservoir 10, to be returned back to the main tank 11.

The reservoir 10 and the main tank 11 are integrally formed with one another so as to form a single monolithic structure. It is to be appreciated, however, that the reservoir 10 and the main tank 11 can be manufactured separately from one another, as completely separate components or as two molded halves, and then welded, seamed, joined or otherwise permanently affixed or secured to one another, during the fabrication process, to form an integral, monolithic structure.

A fuel system module 23, for the fuel system 1, comprises a conventional fuel pump 24 which has a primary fuel inlet 26. The primary fuel inlet 26 of the fuel pump 24 is located within or extends through the aperture 20, provided in the reservoir 10, for retrieving fuel 9A from the main tank 11. A sock-type primary filter 28 covers the primary fuel inlet 26 and filters the fuel 9A, pumped from the main tank 11, before the fuel 9A is supplied to a remainder of the fuel system 1. The fuel pump 24 sucks fuel 9A through the primary filter 28 and primary fuel inlet 26 and supplies the fuel 9A, via a secondary fuel outlet 38, to the reservoir 10. Reserved fuel 9B is drawn in, via a secondary fuel inlet 40, from the reservoir 10, as necessary, and exhausted via a primary fuel outlet 30. From there, the fuel passes through a secondary fuel filter 32 and enters an inlet 34 of an engine fuel supply conduit 36 where the fuel is conveyed to the engine 8 in a conventional manner. As such fuel conveying feature is well known to those skilled in this art, a further detailed description concerning the same is not provided herein.

The fuel pump 24 is designed to supply more fuel than is required by the engine 8 or inlet 40. As mentioned above, the secondary fuel inlet 40 of the fuel pump 24 retrieves fuel 9B from the reservoir 10 to supply that fuel 9B to the engine 8 even when the fuel pump inlet 26 is unable, for one reason or another, to pump a continuous supply of fuel 9A from the main tank 11 to the either the engine 8 and/or the reservoir 10 (this occurs during stops, starts and turns when the fuel level is low). If the quantity of fuel 9B in the reservoir 10 exceeds the capacity of the reservoir 10, the excess reserve fuel 9B is returned to the main tank 11 via the overflow outlet 22.

The fuel system module 23 also includes a locking ring cap 42 which secures a fuel supply module flange 44 to the outlet of the fuel tank reservoir 10. The locking ring cap 42 is provided with an internal thread which releasably mates with an external thread provided on the exterior surface of the fuel supply outlet 12. It is to be appreciated that the arrangement could be reversed, as can be seen in FIG. 1B, where the locking ring cap 42 is provided with an external thread and the fuel supply outlet 12 is provided with a mating internal thread. The fuel supply module flange 44 retains or supports the fuel pump 24 and also contains the secondary fuel filter 32 and a first portion of the engine fuel supply conduit 36 which supplies the fuel to the engine 8. Lastly, the fuel system module 23 can also accommodate various conventional electrical components (not shown in the drawings in further detail) which control operation of the fuel pump 24. As such electrical components are well known to those skilled in this art, a further detailed description concerning the same is not provided herein.

The design of the fuel system module 23, the fuel pump 24, and the reservoir 10 are such that only the primary fuel inlet 26 of the fuel pump 24 extends through the aperture 20 of the reservoir 10 and is located closely adjacent the bottom wall 16 of the main tank 11, i.e. the primary fuel inlet 26 is located closely adjacent the bottom of the fuel tank. The bottom of the fuel pump 24 is sealed in a conventional manner with respect to the aperture 20 of the reservoir 10, e.g. a suitable gasket, to retain the reserve fuel 9B in the reservoir 10. The reservoir bottom wall 14 and the support members 18 maintain the primary fuel inlet 26 of the fuel pump 24 at a proper location so that the fuel pump 24 is correctly positioned to continuously supply fuel 9A from the main tank 11 to the engine 8.

When a vehicle, in which the fuel tank 2 is situated, is operating on curve or a hill, for example, with a relatively small quantity of fuel in the fuel tank 2, the fuel 9A may be forced or directed away from the primary fuel inlet 26 of the fuel pump 24 and thus the fuel pump 24 will still pump fuel 9B from the reservoir 10, via the secondary fuel inlet 40, thus maintaining a constant fuel flow to the engine 8 via the fuel supply system. Once the effects of operating the vehicle subside and fuel 9A in the main tank 11 settles to the bottom of the main tank 11, the fuel 9A again communicates with the primary inlet 26 of the fuel pump 24. When the fuel 9A is located adjacent the primary inlet 26, the fuel pump 24 can resume pumping fuel 9A from the main tank 11 to the reservoir 10.

By securing the reservoir bottom wall 14 to the main tank bottom wall 16, such connection substantially prevents or minimizes any bowing or flexing of the main tank bottom wall 16, especially when carrying a full load of fuel or during pressure changes within the tank due to the temperature changes, for example. In addition, the primary fuel inlet 26 of the fuel pump 24 is always correctly located adjacent the main tank bottom wall 16 for supplying the fuel 9A to the reservoir 10.

When repair of the fuel system module 23 is required, a technician merely loosens the locking ring cap 42 from the external thread provided on the fuel supply outlet 12. Thereafter, the technician can easily remove the fuel system module 23 and replace either the fuel pump 24, the primary filter 28, the secondary filter 32, and/or any other electrical or mechanical component(s) requiring service or replacement. Once the fuel system module 23 is properly serviced, the technician merely reinstalls the fuel system module 23 within the fuel supply outlet 12 and fastens the locking ring cap 42.

Figure 2:
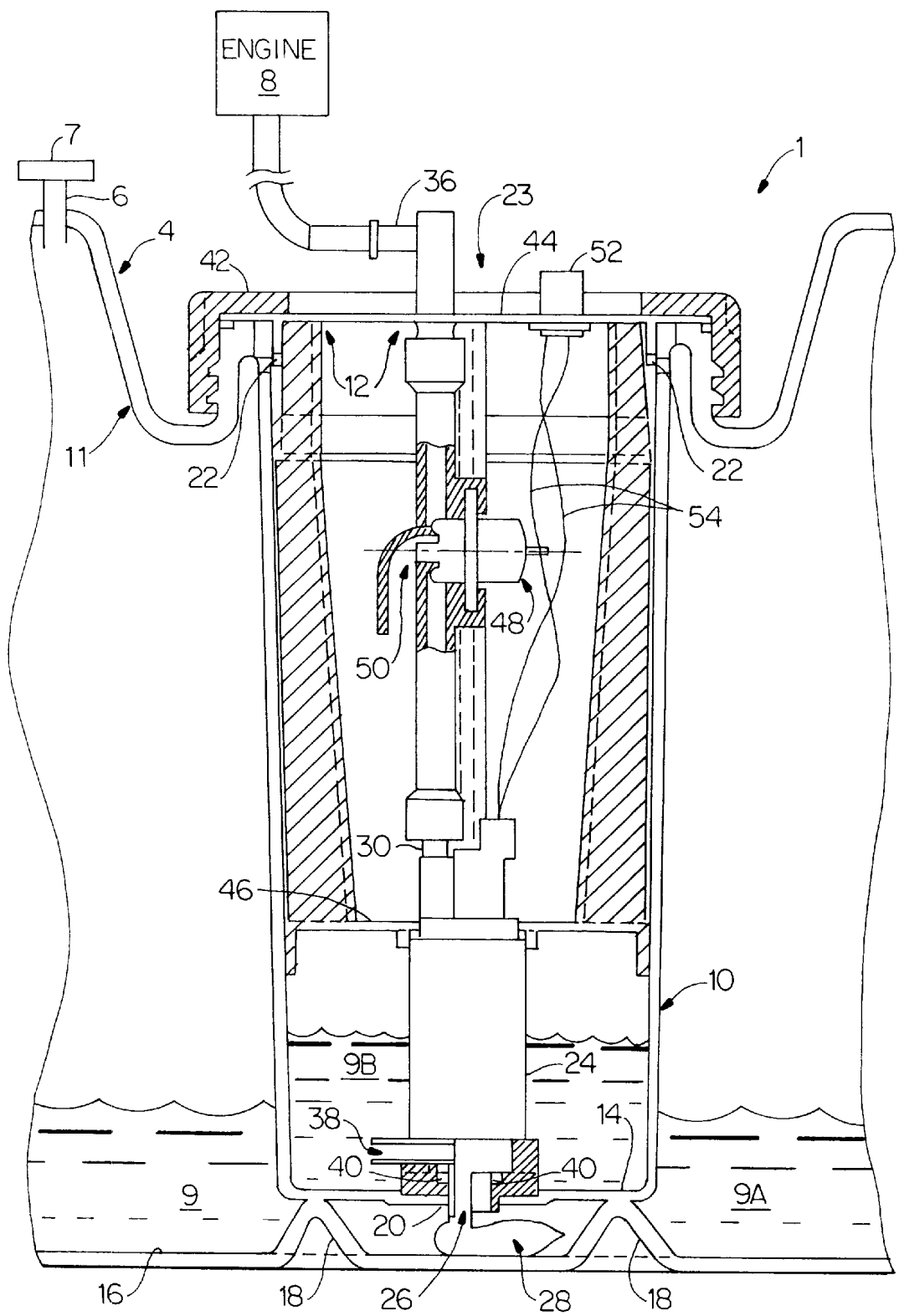
FIG. 2 is a partial diagrammatic drawing of a second embodiment for fuel tank system, according to the present invention, for a taller fuel tank.

Turning now to FIG. 2, a second embodiment of the present invention will now be described. It is to be appreciated that the like elements are given the same reference numeral and thus a further detailed description concerning those items is not provided. The design shown in this Figure is for a "deep gas tank", e.g. a gas tank having a spacing of at least 8 inches from the top of the fuel supply outlet 12 to the main tank bottom wall 16.

The major difference between this embodiment and the previous embodiment is that a fuel pump retainer 46 is provided for spacing the fuel pump 24 away from the fuel supply module flange 44 and through the aperture 20 of the reservoir 10 so that the desired pumping of fuel 9B can be achieved. The opposite end of the fuel pump retainer 46 is integrally formed with or secured to the fuel supply module flange 44.

A second difference is that the primary fuel outlet 30 of the fuel pump 24 communicates with an inlet of a bypass pressure regulator 48 which regulates the pressure of the fuel to be supplied to the engine 8 to a desired pressure, e.g. between 40 psi to 65 psi. If the supply pressure exceeds the established pressure limit, the excess pressure is removed by the bypass pressure regulator 48 and conveyed to a module return conduit 50 which communicates with the reservoir 10. The removed excess pressurized fuel is conveyed into the reservoir 10 via the module return conduit 50. As such bypass pressure regulator feature is well known to those skilled in this art, a further detailed description concerning the same is not provided herein. Properly regulated fuel is then conveyed to the engine 8, via the engine fuel supply conduit 36, as with the previous embodiment.

A third difference is that a conventional electrical connection to the fuel pump 24 is shown. An electrical device 52, such as pulse width modular for controlling the fuel pump speed, is electrically coupled to the fuel pump 24, via a pair of wires 54.

As with the first embodiment, when a technician removes the locking ring cap 42, the entire fuel system module 23 can be readily removed from the fuel supply outlet 12 so that servicing or replacement of any desired component of the fuel system module 23 is readily achieved. Once the servicing is completed, the fuel system module 23 is reinstalled within the fuel supply outlet 12 for the further supply of fuel 9.

Figure 3:
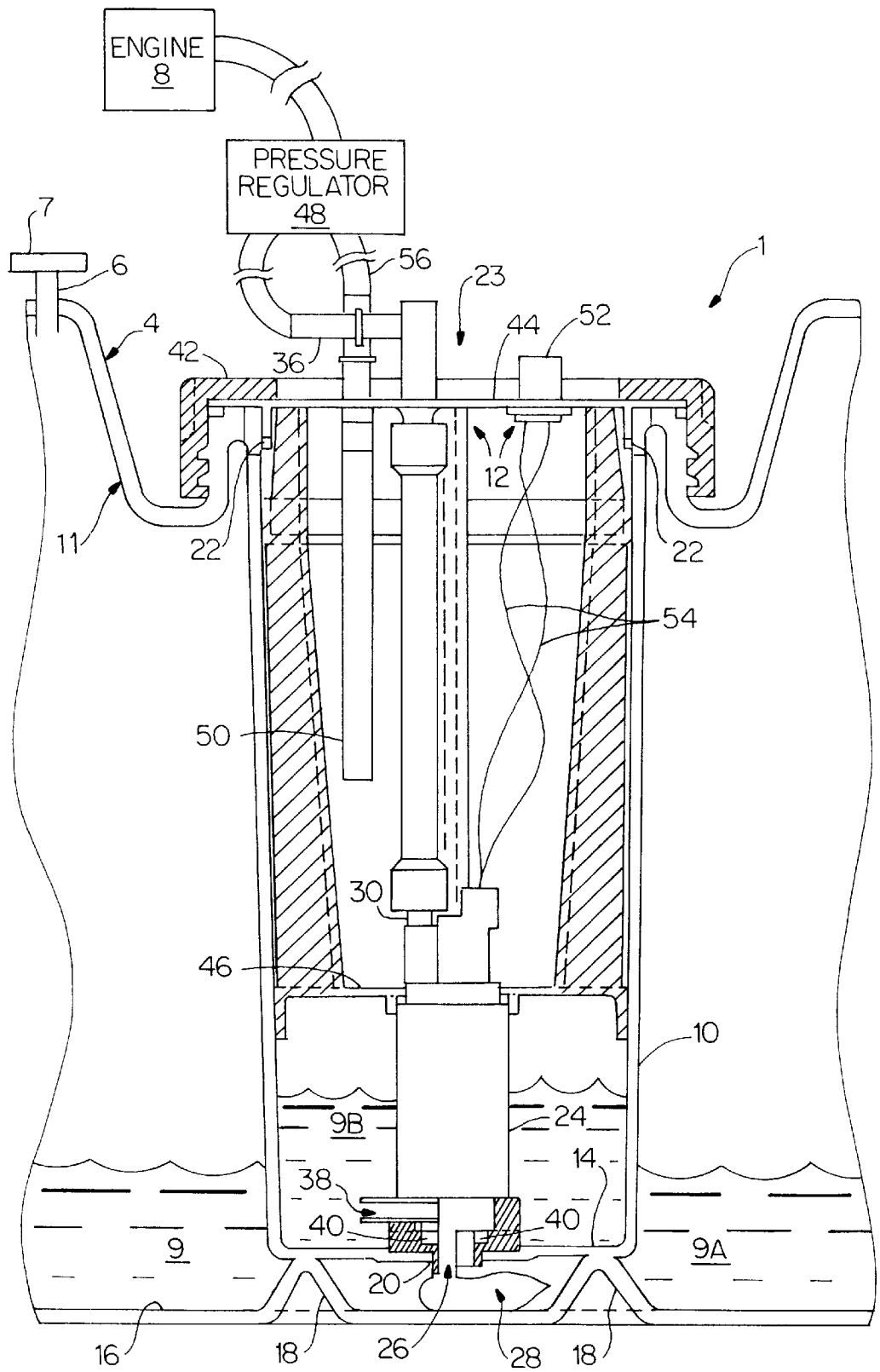
FIG. 3 is a partial diagrammatic drawing of a fuel tank system, according to the present invention, similar to the embodiment of FIG. 2 which includes a return fuel line.

With reference to FIG. 3, a third embodiment of the present invention will now be described. As with the previous two embodiments, like components are given the same reference numerals and thus a further detailed description concerning those components is not provided. The major difference between this embodiment and the embodiment of FIG. 2 is that the bypass pressure regulator 48 is installed at a desired location along the fuel supply conduit 36 but before the engine 8, e.g. the bypass pressure regulator 48 is located adjacent an inlet to the fuel rail on the engine 8. Accordingly, any excess pressurized fuel removed from the fuel system 1, by the bypass pressure regulator 48, is returned via a fuel return conduit 56 to the module return conduit 50 and then discharged into the reservoir 10.

Figure 4:
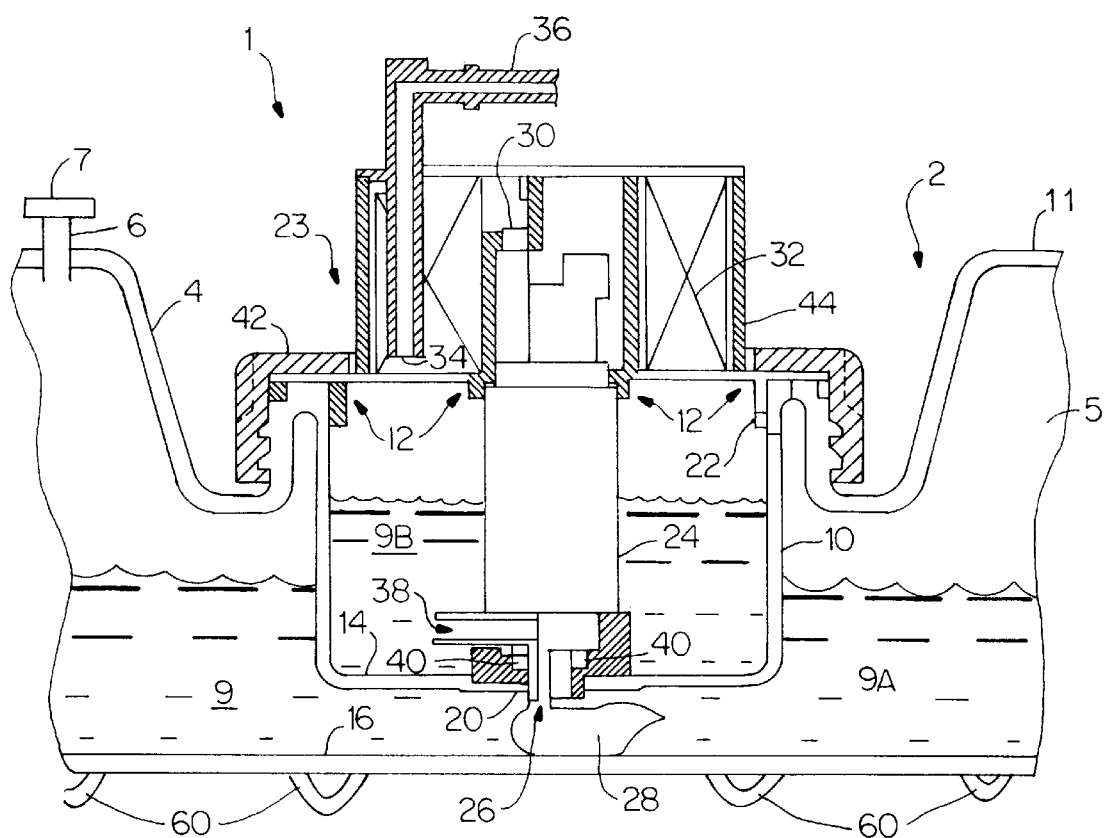
FIG. 4 is a partial diagrammatic drawing of a fuel tank system, according to the present invention, similar to the embodiment of FIG. 1A without a lower support for the reservoir tank.

Turning now to FIG. 4, a fourth embodiment of the present invention will now be described. As with the previous three embodiments, like components are given the same reference numerals and thus a further detailed description concerning those components is not provided. The major difference between this embodiment and the embodiment of FIG. 1 is that the support members 18 are not necessary in this embodiment. That is, the main tank bottom wall 16 is able to move somewhat relative to the reservoir bottom wall 14.

In order for this arrangement to be practical, the main tank 11 must be formed from a rigid enough material, or be reinforced in a conventional manner, e.g. ribs 60, such that the main tank bottom wall 16 will only be allowed to flex or bow minimally or insignificantly, relative to the reservoir bottom wall 14, so that the primary fuel inlet 26 of the fuel pump 24 will still be correctly located to pump and supply all of the fuel 9A from the main tank 11.

The tank 11, the reservoir 10, the locking ring cap 42, and/or the fuel supply module flange 44 can be made from a plastic material such as an acetal plastic material, a composite material, a metal, a metal alloy, or any other known material which is structurally able to support the required forces and loads and withstand prolonged contact with the utilized fuel.

The fuel pump 24 is preferably a dual stage pump or spilt pumping mechanism in series having a first stage which pumps, via the primary fuel inlet 26, a relatively low pressure but high volume flow of fuel from the main tank 11 to the reservoir. i.e. via secondary fuel outlet 38, and a second stage which pumps a relatively high pressure but low volume flow of fuel from the reservoir, i.e. via secondary fuel inlet 40, to the engine. It is to be appreciated that the fuel pump 24 may also be designed so that the fuel pump 24 generally pumps the fuel from the main tank 11 to the engine 8 and only retrieves fuel, via the secondary fuel inlet 40, in the event that the fuel pump 24 is unable, for one reason or another, to pump fuel from the main tank.

The fuel pump 24 can be any number of conventional pumps typically used in the industry. In this particular embodiment, the fuel pump 24 can be a pump sold by Walbro Corp. made in accordance with U.S. Pat. No. 4,500,270, which teaching is incorporated herein by reference.

The bypass pressure regulator 48 can be a regulator which is sold by Siemens Automotive Corp. of Newport News, Va., for example. However, any other conventional pressure regulator which can operate within the required performance parameters may be utilized.

The advancements found in the present invention are illustrated in all four shown embodiments. Those advancements include the ease of access to the inside of the reservoir 10 as well as the ease of access to the fuel pump 24 and fuel filters 28, 32. In all cases, the locking ring cap 42 and the fuel system module 23 must be removed and then full access is gained to the interior of the reservoir 10 and to each component of the fuel system module 23. This greatly simplifies any attempts by a technician to repair or replace any malfunctioning or faulty component(s) located within the fuel tank 2. This configuration also eliminates the need for any additional support structures or hangers for guiding a separate fuel delivery module. Thus, if only the fuel pump 24 needs replacement, for example, the fuel pump 24 can be readily replaced and the remaining components of the fuel system module 23 may be reused.

It is to be appreciated that the resevoir bottom wall 14 could be conical in shape, if desired, with aperture 20 being provided at the base of the conical bottom wall to facilitate consuming virtually every ounce of fuel from the fuel tank.

Since certain changes may be made in the above described fuel system, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. An improved fuel storage system comprising:

a fuel tank having an exterior wall defining an interior cavity, a reservoir and a tank opening, and said interior cavity being suitable for holding a desired quantity of fuel;

said reservoir communicating with said tank opening for supplying fuel from said reservoir to an engine of a motor vehicle, and said tank opening being sealed by a removable closure; and said reservoir being disposed within said interior cavity of said fuel tank and being suitable for holding a second desired quantity of fuel;

wherein said reservoir communicates only with said tank opening, except for a fuel overflow aperture and a fuel supply aperture provided in said reservoir, the overflow aperture and the supply aperture providing communication between said interior cavity and said reservoir, and said exterior wall preventing direct access from said tank opening to said interior cavity.

2. The improved fuel storage system according to claim 1, wherein said exterior wall defining said interior cavity and said reservoir is an integral structure.

3. The improved fuel storage system according to claim 2, wherein said integral structure is a molded structure.

4. The improved fuel storage system according to claim 1, wherein said overflow aperture is located adjacent said tank opening for returning excess fuel supplied to said reservoir back to said interior cavity.

5. The improved fuel storage system according to claim 4, wherein a fuel pump is mounted within said reservoir and communicates with said interior cavity of said fuel tank, via said fuel supply aperture, to supply fuel to said engine.

6. The improved fuel storage system according to claim 5, wherein the removable closure includes a replaceable locking ring which sealingly mates with said tank opening to seal said tank opening.

7. The improved fuel storage system according to claim 6, wherein the locking ring secures a fuel pump flange to said tank opening, and a fuel pump flange supports said fuel pump, and said fuel pump communicates with a remainder of said interior cavity of said fuel tank, via said fuel supply aperture, to supply fuel to said engine and said reservoir.

8. The improved fuel storage system according to claim 5, wherein said fuel pump has a primary inlet which communicates with said interior cavity, via said fuel supply aperture, and a primary outlet which communicates with said engine.

9. The improved fuel storage system according to claim 4, wherein said primary inlet of said fuel pump is provided with a primary filter to filter the fuel prior to supplying fuel to said engine.

10. The improved fuel storage system according to claim 9, wherein a secondary filter is provided adjacent said primary outlet of said fuel pump to filter the fuel prior to supplying fuel to said engine.

11. The improved fuel storage system according to claim 10, wherein said fuel pump has a secondary outlet which communicates with said reservoir, for pumping fuel from said fuel tank to said reservoir, and a secondary inlet, which communicates with said reservoir, for supplying fuel from said reservoir to said engine.

12. The improved fuel storage system according to claim 8, wherein a pressure regulator is provided between said primary outlet of said fuel pump and said engine for regulating the fuel at a desired supply pressure for supply to the engine.

13. The improved fuel storage system according to claim 12, wherein said pressure regulator includes a return conduit, which is connected to said reservoir, for returning excess fuel to said reservoir.

14. The improved fuel storage system according to claim 1, wherein said reservoir has a bottom portion and said interior cavity has a bottom portion and said reservoir bottom portion is connected to said interior cavity bottom portion by at least one support.

15. The improved fuel storage system according to claim 1, wherein said removable closure is provided with an internal thread and said tank opening is provided with a mating external thread to facilitate the releasable engagement therebetween.

16. The improved fuel storage system according to claim 1, wherein said removable closure is provided with an external thread and said tank opening is provided with a mating internal thread to facilitate the releasable engagement therebetween.

17. An improved fuel storage system comprising:

a fuel tank having an exterior wall defining an interior cavity suitable for holding a desired quantity of fuel and a further cavity having an opening formed in the exterior wall; and said further cavity being disposed within said interior cavity of said fuel tank and said further cavity communicating with said tank opening for supplying fuel from said interior cavity to an engine;

wherein said further cavity communicates only with said tank opening, and said exterior wall defining said further cavity prevents direct access from said tank opening to said interior cavity.

18. A method of manufacturing a tank, said method comprising the steps of:

forming an exterior wall defining an interior cavity, a further cavity and an opening and sizing said interior cavity to hold a desired quantity of fluid;

sealing said opening via a removable closure;

disposing said further cavity within said interior cavity and sizing said further cavity to hold a desired quantity of fluid;

separating, via the exterior wall, both said tank opening and said further cavity from said interior cavity such that said tank opening directly communicates only with said further cavity; and forming said exterior wall adjacent said tank opening to encompass said tank opening such that said exterior wall separates both said tank opening and further cavity from said interior cavity.

* * * * *